Nov. 14, 1950 E. S. PETERSON 2,530,075

SIGNAL UNIT FOR TELEPHONE CONVERSATION RECORDERS

Filed Nov. 12, 1948

INVENTOR.
EDWARD S. PETERSON
BY
Chas. W. Candy
ATTORNEY

Patented Nov. 14, 1950

2,530,075

UNITED STATES PATENT OFFICE 2,530,075

SIGNAL UNIT FOR TELEPHONE CONVERSATION RECORDERS

Edward S. Peterson, Elmwood Park, Ill., assignor to Automatic Electric Laboratories, Inc., Chicago, Ill., a corporation of Delaware Application November 12, 1948, Serial No. 59,667

9 Claims. (Cl. 179—6)

Figures 1, 2:
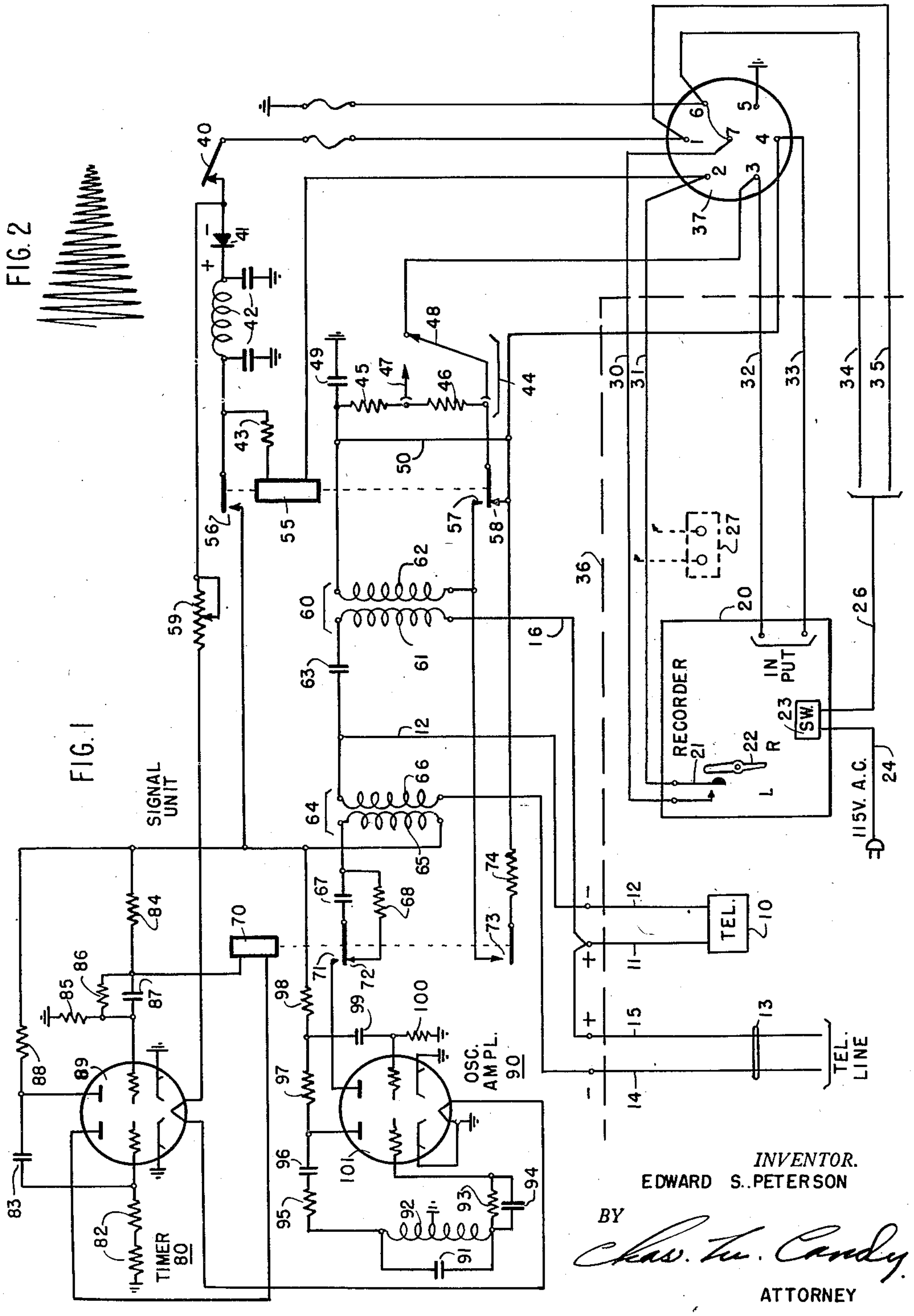

This invention relates in general to machines for recording telephone conversations, and is more particularly concerned with auxiliary apparatus for such a machine for giving a warning signal to the parties involved that the conversation recorder is in operation and that the conversation is being recorded.

Arrangements for accomplishing this basic result are known, as by the obvious method for example, of adding a cam to the turntable, or to the drive shaft of the recorder, for connecting up the signal. Such arrangements however, require the use of special recorders or a more or less extensive modification of existing recorders, do not provide a distinctive signal, do not allow for varying volumes of signal to the parties, are not self-contained, or are otherwise more or less unsatisfactory.

It is accordingly, the main object of the present invention to provide a self-contained combination signal-unit-and-connecting-box for a conversation recorder, which is suitable for use with any recorder, and which also provides that the tone unit must be in operation whenever the recorder is in operation to record a call.

It is another object of the invention to provide an intermittent audible signal which will be both distinctive and unmistakable, without great volume or intensity, and without detriment to either the conversation or the recording.

Another object of the invention is the provision of simple means for separately varying the intensity of the signal as supplied to the line, to the near telephone, and to the recorder.

A feature of the invention is the manner of interconnecting the signal unit, the telephone, the line and the recorder so as to provide the proper volumes of speech and signals to each.

Another feature of the invention lies in the provision of two transformers in said signal unit connected in tandem with the signal generator at one end, the recorder at the other end, and the telephone and line connected between the transformers, with means for shunting the recorder side of said connection while the signal is on to reduce the volume thereof to the telephone and recorder.

Another feature of the invention is the use of an electronic oscillator and amplifier and an electronic timer in the signal unit, and a relay controlled by said timer for applying the signal and connecting up the volume reducing means.

Other objects and features of the invention will be apparent from the specification and claims which follow, when considered in conjunction with the appended drawing, comprising the Figures 1 and 2, which illustrate one embodiment of the invention.

Figure 1 of the drawing illustrates in conventional circuit diagram form, the connecting and signal unit of the invention, and a portion of the associated equipment.

Figure 2 shows in idealized diagrammatic form, the general overall wave shape, or envelope, of the audible signal.

With further reference to the drawing, the signal unit proper includes everything in Figure 1 on the upper and right sides of the broken line 36, while on the under side of this line are shown an associated telephone line 13, a telephone 10, a recorder 20, and an alternative auxiliary starting device 27. It will be noted that the telephone 10 is connected to the line 13 through the tone unit, over a direct current loop circuit comprising the conductor 14, winding 66 of the transformer 64, conductor 12, the telephone 10, and conductors 11 and 15. This loop is of course normally open at the hook-switch contacts, not shown, of the telephone 10. The telephone 10, which may be any conventional form of instrument, is also connected in shunt across the condenser 63 and the winding 61 of the transformer 60, over the conductors 12, 11 and 16.

The recorder 20, which may be any conventional form of voice recording device, is here assumed to be a sound recording and reproducing machine generally similar to that shown and described in U. S. Patent 2,366,458, issued to Barton A. Proctor on January 2, 1945. A pair of contacts 21 added to this machine subsequently, are arranged to be operated by the control lever 22 only when it is moved to the recording position, so that it points to the letter R. The contacts 21 are unoperated when the lever 22 is in the normal, illustrated position, or when it is moved to the play-back or listening position where it points to the letter L. A power switch, indicated by the small rectangle 23, is arranged to connect commercial power to the recorder and to the tone unit, by way of the plug ended cord 24 and the cord 25, which may also be a single cord of the Y connected type.

In case however, that the machine employed has no facilities for passing power in this manner to the signal unit, the cord 26 may also be a plug ended cord whereby the signal unit may be separately connected directly to the stated commercial power source. Furthermore, if no contacts 21 are available in the recorder, a separate starting arrangement, consisting of a start-stop-push-button-set 27, shown in dotted lines, may be employed. Operation of the start button will connect conductors 30 and 31 in the same manner as the contacts 21, and a subsequent operation of the stop button will release the start button, and open its contacts, not shown.

The connecting signal unit, which may be conveniently mounted in a small housing no larger in size than a telephone ringer box, consists essentially of an electronic timer 80 controlling a signal relay 70, an electronic oscillator-and-amplifier 90, a pair of tone transformers 64 and 60, a power relay 55, and a single phase disc rectifier and associated filter, together with various resistors and capacitors as shown. This unit is connected to the telephone and line through the four line terminals shown at the left, and to the recorder by way of a seven prong plug receptacle 37 shown at the lower right.

The timer 80, which employs an unbalanced multivibrator circuit, includes a dual triode vacuum tube 89, a pair of grid condensers 83 and 87 of equal value, a pair of unbalanced grid resistors 82 and 85 with the former having a much higher resistance than the latter, and a pair of unbalanced plate resistors 84 and 88 with the latter having the higher resistance. The left section of the tube thus has a long time constant in its grid circuit and the right section a short time constant, with the values so chosen that the left section is cut off or non-conducting for 15 seconds, and conducts for ⅕ second, while the right section is non-conducting for ⅕ second and conducts for 15 seconds. The signal relay 70 connected in the plate circuit of the left hand section is thus operated for a period of approximately ⅕ second every 15 seconds. A high value resistor 86 bridged around the grid condenser 87 aids in causing the timing relay to release more quickly, by helping to drain the charge from the condenser 87 while the left section of the tube is conducting.

In the oscillator-amplifier 90, the oscillator, which employs the left section of a second dual triode tube 101, is a simple Hartley oscillator of the stabilized grid and plate type, tuned to oscillate at a frequency of 1400 cycles per second. Its elements include, in addition to the tube, a blocking condenser 96 and an associated resistor 95, a grid condenser 94 and an associated grid leak resistor 93, and an oscillating or tank circuit comprising a two-section inductor 92 and an associated bridging condenser 91. The amplifier, which raises the oscillator output to the proper level for application to the telephone line is a simple resistance-coupled one-stage unit comprising the right section of the tube 101, the coupling resistors 97 and 98, the grid condenser 99 and the grid resistor 100.

The amplifier output is connected momentarily to the primary of the tone transformer 64 through the series condenser 67, each time the signal relay 70 operates. The secondary of this transformer is connected to the telephone line in series with the condenser 63 and the primary of the recorder coupling transformer 60, while the telephone 10 is connected in parallel with a portion of this circuit as previously indicated. The secondary of the transformer 60 is connected to the speech input circuit of the recorder through make contacts 57 of the power relay 55, whenever this relay is operated, by way of a bleeder circuit 44 comprising the resistors 45 and 46. Where a recorder having automatic volume control is used, the recorder input will be connected across the entire resistance, by means of the strap or jumper 48, but where the recorder used does not provide for automatic volume control, its input will be connected across the upper resistor 45 only, by means of the strap 47, to avoid overloading the recorder. It will be herein assumed that the strap 48 is connected and the strap 47 omitted.

A very low value resistor 74 is also arranged to be shunted across the bleeder resistors by the contacts 73 whenever the signal relay 70 operates to put the warning tone on the line. This greatly reduces the value of the splash of tone applied to the recorder. This is considered necessary to avoid mutilation of the record, since the volume of tone required for transmission to the distant end of the line would cause an excessive response in the recorder. It is desirable that the signal appear in the record, but only in reduced volume.

The power supply to the filaments of the tubes is 115 volts alternating current fed through a toggle switch 40, which is closed, together with the recorder switch 23, whenever it is desired to place the recorder in standby condition. The filaments are in series with each other and with a variable resistor 59, which may be adjusted as necessary to maintain the filament current at the proper value. The plate supply is fed from the same 115 volt source through the switch 40 and a single phase disc rectifier unit 41 in series with a filter 42 comprising a filter choke and two filter condensers. Plate voltage is applied to the tubes however only when the power relay 55 is operated to close contacts 56. The power relay 55 must also be operated to remove a direct short circuit, represented by the contacts 58, from across the recorder input leads 32 and 33.

It is thus seen, that regardless of the particular type of recorder control employed, the recorder, when connected to the line through this unit, will not under normal conditions, record any conversations on the line, unless the tone unit is also in operation. This is obvious, since the power relay 55, which starts the oscillator and timer, must be operated to remove the shunt from the input circuit of the recorder, and to connect up the secondary of the transformer 60.

To place the recorder and signal unit in service, the telephone and line are connected to the signal unit line terminals as shown, and assuming the illustrated recorder 20 to be used, the multi-conductor plug, not separately shown, which terminates the recorder leads 30 to 35 inclusive, is plugged into the receptacle 37 and locked. The cord 24 is then plugged into the 115 volt supply source. Since the recorder 20 is also assumed to have automatic volume control, the strap 48 on the voltage divider 44, which is normally connected, will be left in place.

To place the recorder in standby condition, ready for operation to record a call, it is now only necessary to close the recorder power switch 23 and the signal unit power switch 40. Filament current is thereby caused to flow through the switch 40, the resistor 59 and the filaments of the tubes 89 and 101 in series, and the filaments heat up. Rectified power is also applied to one side of the power relay 55, through the rectifier 41.

To start recording a conversation taking place over the line 13, it is now only necessary to move the recorder arm 22 to the recording position. The recorder contacts 21 are thereby closed, and complete a circuit to the power relay 55, over a circuit starting at one side of the power supply, and passing over conductor 35, terminal 1, switch 40, rectifier 41, filter 42, resistor 43, winding of relay 55, terminal 2, conductor 31, contacts 21, conductor 30, terminals 7 and 6, and conductor 34 back to the other side of the power supply.

The power relay 55 thereupon operates, from the positive half cycles of current passed by the rectifier 41, and remains operated during the recording. Relay 55 upon operating, at its contacts 58 removes the direct short from the leads 32 and 33 leading to the recorder input circuit, at its contacts 57 prepares another shunting circuit controlled from contacts 73, and at its contacts 56 connects anode voltage to the oscillator and timer. Plate voltage now extends to the oscillator anode through the resistors 98 and 97, to the left anode of the timer through the resistor 84 and the relay 70, and to the right anode of the timer through the resistor 88.

The oscillator now starts to oscillate, at a frequency of 1400 cycles per second, and the timer starts to pulse rhythmically, over these circuits, with the two sides of the timer conducting in turn, in the manner previously stated. As each section of the timer conducts, it charges the condenser in its own grid circuit and draws the charge from the condenser in the opposing grid circuit until the triggering point is reached, when the other section begins to conduct and reverses the process in known manner. Each time the left section conducts, the timer relay 70 is operated for approximately ⅕ second, as previously stated, over the circuit comprising the positive terminal of the rectifier 41, the contacts 56, the resistor 84, the relay 70, and the left anode and cathode of the tube 89 to the negative side of the same circuit, represented by ground.

Each time the relay 70 operates in this manner, its contacts 72 open the normal shunt circuit around the condenser 67, contacts 73 connect the low resistance 74 across the recorder coupling circuit, between the transformer 60 and the bleeder resistors 45 and 46, and the contacts 71 close the amplifier output circuit, which now extends from ground at the right cathode of the tube 101, through the tube to the right anode, contacts 71, condenser 67, the primary winding 65 of tone transformer 64, and contacts 56 to the positive terminal of the rectifier 41.

A splash of amplified 1400 cycle tone from the oscillator is thereby impressed on the primary of the transformer 64, and thence to the line 13, by way of the secondary winding 66, condenser 63, the primary winding 61 of the recorder coupling transformer 60 and the conductors 16, 15 and 14. Since this circuit is quite resonant at voice frequencies it puts the tone on the line at a relatively high value. The tone is at full volume only very briefly however, due to the attenuating action of the condenser 67, which as it charges cuts the current flow down very rapidly. This gives the tone wave a shape generally like that shown in Figure 2, and provides a very distinctive audible signal, quite similar to the "ping" of a stringed instrument when one of the strings is plucked sharply. This assures that the signal will register through the conversation, even when considerably muted, or reduced in volume. It also assures a very short signal, as the tone is completely attenuated before the timer relay restores.

From the primary winding of the coupling transformer 60 the tone signal is further induced into the secondary winding 62, appears across the resistors 45 and 46 and passes therefrom to the recorder input circuit. Due to the fact that the low value resistor 74 is now bridged across the resistors 45 and 46 by way of contacts 73 and the conductor 50, the volume of the tone signal actually impressed upon the recorder terminals, is very much reduced, so that when the recording is played back, the signal while still audible due to its form, will not be too prominent. The shunting of the secondary of the coupling transformer 60 by the resistor 74 also causes a portion of the tone signal to be echoed or reflected back into the primary circuit, and thence to the telephone 10, which is connected in multiple with this circuit, as previously mentioned. The tone to the telephone 10 is thus also considerably reduced in volume.

When the signal relay 70 restores, at the end of the ⅕ second conducting interval, its contacts 73 remove the shunt from the recorder coupling circuit, its contacts 71 open the amplifier output circuit leading to the tone transformer 64, and its contacts 72 place a shunt around the tone attenuating condenser 67. The condenser 67 thereupon discharges quickly through the shunting resistor 68, which has a comparatively low resistance, and is completely discharged long before the next operation of relay 70, some 15 seconds later.

At the end of the conversation, or whenever the recorder control lever 22 is restored to the neutral position, or is shifted to the play-back or listening position, the contacts 21 open the circuit to the power relay 55 which restores. Relay 55 thereupon, at contacts 57 disconnects the secondary of the recorder coupling transformer 60, and at contacts 58 replaces the direct shunt across the recorder input conductors 32 and 33. Relay 55 also, at its contacts 56 disconnects plate voltage from the oscillator and timer, which thereupon cease operation.

While there has been described what is at present considered as the preferred embodiment of this invention, it should be understood that various changes and re-arrangements may be made therein without departing from the spirit and scope of the invention as set forth in the appended claims.

What is claimed is:

1. In a signal system, a telephone, a telephone line, a conversation recorder, a signal unit, said telephone, said line, said unit and said recorder being interconnected only electrically, a tone generator and a timer in said signal unit, manually operated means for conditioning said recorder to record a conversation occurring between said telephone and said line, a relay in said signal unit operated responsive only to the operation of said conditioning means, contacts on said relay, a normally short-circuited speech input circuit for said recorder, means including said contacts responsive to the operation of said relay for re-enabling said input circuit and for starting said tone generator and said timer, and means responsive to the operation of said generator and timer for transmitting an intermittent audible signal simultaneously to said telephone, to said line, and to said recorder.

2. In a signal system as in claim 1, an output circuit for said tone generator, and a capacitor in said ouput circuit for passing the full volume of said signal only very briefly, and then quickly attenuating said signal.

3. A signal system as in claim 2, in which said output circuit includes a tone amplifier, and in which said capacitor is charged by the passage of the signal after its amplification by said amplifier.

4. In a signal system, a telephone line, a conversation recorder, a signal unit having a signal tone generator and a timer therein, means for conditioning said recorder to record a conversation on said line, a start relay in said signal unit responsive only to the operation of said conditioning means for operating said tone generator and said timer, a first transformer in said unit for coupling said generator to said line, a second transformer in said unit for coupling said generator and said line to said recorder, a signal relay in said unit intermittently operated in response to the operation of said timer, contacts operated by said signal relay, means responsive to the operation of certain of said signal relay contacts for extending the signal tone output of said generator intermittently and simultaneously to said line through said first transformer and to said recorder through said first and second transformers, and other means responsive to the operation of others of said signal relay contacts for reducing the volume of the signal tone extended to said recorder only.

5. A signal system as in claim 4, wherein said signal reducing means comprises a resistor connected momentarily across the recorder side of said second transformer.

6. In a signal system comprising a line, a telephone, a voice recorder, and a signal unit all interconnected electrically only, a signal tone generator and a timer associated with said signal unit, means for conditioning said recorder to record speech originating in said telephone and said line, means responsive only to the operation of said conditioning means for operating said generator and said timer, a first transformer for coupling said generator to said line, a second transformer for coupling said generator and said line and telephone to said recorder, a signal relay having contacts operated at regular intervals responsive to the operation of said timer, circuit means responsive to the operation of certain of said relay contacts for extending the signal tone output of said generator intermittently through said transformers to said line, said telephone and said recorder simultaneously, and other circuit means responsive to the operation of others of said relay contacts for reducing the volume of the signal tone passed to said telephone and said recorder only.

7. A signal system as in claim 6 in which said telephone and line are interconnected by a direct current loop circuit including a winding on said first transformer, and in which said line is also acoustically connected to windings on both of said transformers in series, with said telephone connected acoustically in shunt across one of said windings.

8. A signal system as in claim 6, in which said line is connected in series with windings of both said transformers, in which said telephone is connected across one winding of said second transformer and said recorder across the other winding, and in which said volume reducing means is also connected momentarily across said other winding of said second transformer while said tone signal is being extended.

9. The combination of a line, a recorder for recording messages passing over said line, a signal unit for impressing spaced audible warning signals on said line only when said recorder is actually recording messages passing over said line, an electronic tone oscillator for generating said signals, an electronic amplifier for raising the volume of said signals, an electronic timer for applying said spaced and amplified signals to said line during the time said recording is taking place, and capacitor means for attenuating said signals quickly following their application to said line to give said signals a characteristic sharp note.

EDWARD S. PETERSON.

REFERENCES CITED

The following references are of record in the file of this patent:

UNITED STATES PATENTS

| Number | Name | Date |
|---|---|---|
| 1,551,319 | Meyberg | Aug. 25, 1925 |
| 1,780,919 | Holland | Nov. 11, 1930 |
| 1,845,034 | Bickelhaupt | Feb. 16, 1932 |
| 2,340,159 | Thompson | Jan. 25, 1944 |